Sept. 30, 1952 — R. C. LINDEMANN — 2,612,138
ANIMAL FOUNTAIN
Filed July 5, 1950 — 2 SHEETS—SHEET 1

Reinhard C. Lindemann
INVENTOR.

Sept. 30, 1952  R. C. LINDEMANN  2,612,138
ANIMAL FOUNTAIN
Filed July 5, 1950  2 SHEETS—SHEET 2

Reinhard C. Lindemann
INVENTOR.

BY *Clarence A. O'Brien*
*and Harvey B. Jacobson*
Attorneys

Patented Sept. 30, 1952

2,612,138

UNITED STATES PATENT OFFICE 2,612,138

ANIMAL FOUNTAIN

Reinhard C. Lindemann, Lucca, N. Dak.

Application July 5, 1950, Serial No. 172,060

4 Claims. (Cl. 119—75)

This invention relates to improvements in stock watering devices.

An object of this invention is to prevent a stock trough from freezing during the winter months by means of providing a trough with a water chamber in the walls thereof, together with two pipe lines, one introducing heated water into the chamber and the other introducing cool water into the trough, the line conducting the heated water having a thermally responsive control valve therein.

Another object of this invention is to provide an improved cover for the trough to prevent the animals from climbing in the trough.

Another object of this invention is to provide such an assembly which includes the feature of a means of providing water in the trough which is controlled by means of the animals seeking water.

Other objects and features of importance will become apparent in following the description of the illustrated form of the invention.

Figure 1:
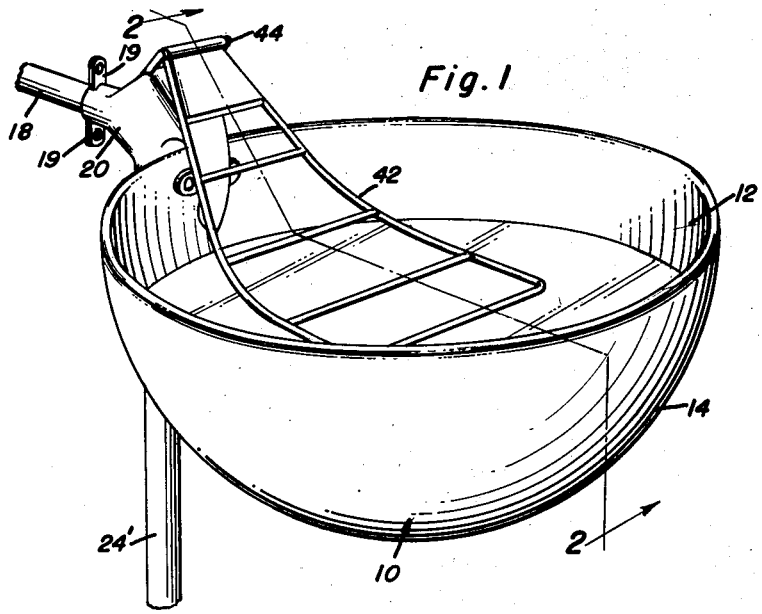
Figure 1 is a perspective view of one form of the invention.
Figure 2:
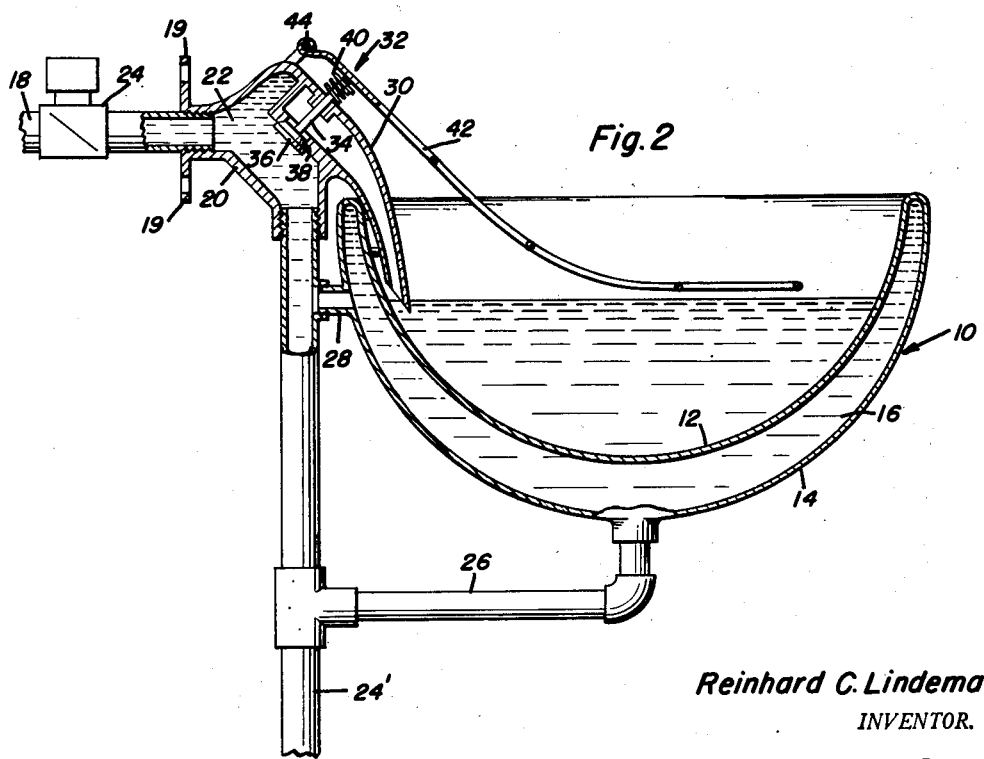
Figure 2 is a sectional view taken substantially on the line 2—2 of Figure 1 in the direction of the arrows.

In carrying out this invention there is a means forming a trough or receptacle 10 from which the stock is adapted to drink water. Attention is first invited to Figures 1 and 2 wherein the first form of the invention is illustrated. The trough or receptacle 10 consists of an inner wall 12 and an outer wall 14 spaced from the inner wall to provide a heating chamber 16. A heated water line 18, from a suitable source of water under pressure, connects with a case 20 which defines a chamber 22 and which has mounting ears 19 thereon. A suitable thermally responsive control valve 24 is disposed in the heated water line 18.

A cold water supply line or pipe 24' adapted to connect with a suitable source of water is threaded in the case 20. By means of piping 26 the line or pipe 24' connects with the chamber 16 (Figure 2) and a nipple 28 joins the chamber 16 with the line 24' at a point spaced from the piping 26. The description has reference to a cold inlet water pipe however, the water is not artificially cooled but is spoken of as being "cold" in reference to the artificially heated water passing through the line 18.

A spout 30 connects with the chamber 22 and is adapted to conduct water therefrom into the trough 10. This water is to feed the stock.

A valve 32 controls the passage of water from the chamber 22 through the spout 30. This valve is of the poppet type, comprising a stem 34 having on one end thereof a head 36 engageable with a seat 38. The spring 40 reacting on a part of the spout and the operator 42 holds the valve head 36 in the closed position.

The operator 42 consists of a webbing formed of metal which is disposed in the trough 10 and which is pivoted by means of the pin 44 at its upper end to the case 20.

In operation of this form of the invention and the form subsequently described, cool water is introduced through the conduit or riser 24'. The cool water flows into the chamber 22 and through the spout 30 into the trough 10, supplying water to feed the stock, and some water may first flow into the chamber 16. The thermal valve 24 is normally open, permitting warm water in the line 18 to slowly mix or mingle with the unheated water in the chamber 22, the adjacent portion of the line 24', the chamber 16, etc. thereby preventing freezing. When the valve 32 is opened, water from the line 18 will flow through the valve 24 only until it reaches a predetermined temperature, at which time said valve 24 closes.

When the livestock desire a drink of water, they simply seek it from the water chamber of the trough pressing the operator 42 downwardly when the water becomes low to replenish the supply.

Figure 3:
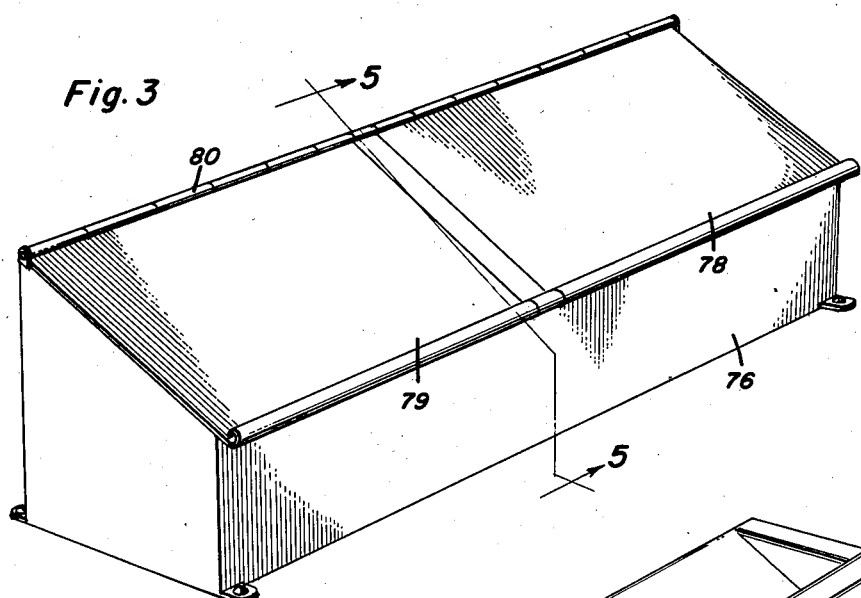
Figure 3 is a perspective view of the second form of the invention.
Figure 4:
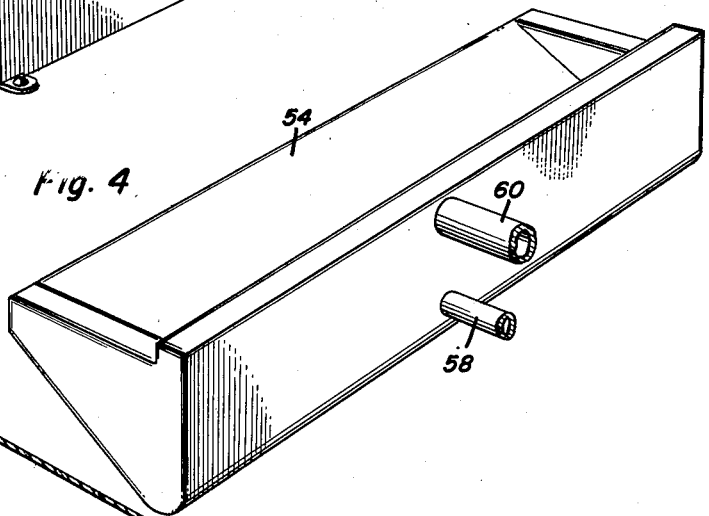
Figure 4 is a perspective view of the trough unit disposed in the casing of Figure 3.
Figure 5:
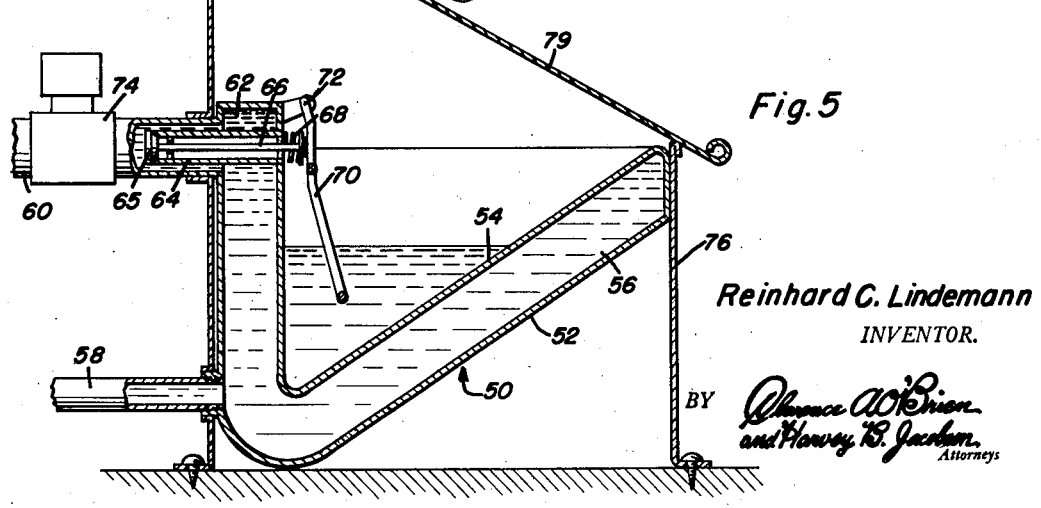
Figure 5 is a transverse sectional view taken substantially on the line 5—5 of Figure 3 and in the direction of the arrows.

Attention is now invited to Figures 3-5 wherein the second form of the invention is shown. Here, the trough 50 is slightly different in shape but includes an outer wall 52 spaced from an inner wall 54 thereby providing the water chamber 56. A cool water inlet line 58 connects with the chamber 56, while a heated water inlet line 60 connects with the chamber 62.

A sleeve 64, open at both ends and communicating with the line 60 and trough 50, is disposed in the chamber 62 to accommodate the head 65 of the valve stem 66, which is disposed in the sleeve. A spring 68 reacts on the inner wall 54 of the trough and on the operator 70 which is of apertured sheet metal construction and which is pivoted by means of the pin 72 to the case forming the chamber 62.

A thermally responsive control valve 74 which is identical in structure and function to the valve 24 is disposed in the heated water inlet line 60.

The trough 50 is disposed in a housing or case 76 and appropriate openings are supplied therein for the purpose of having the pipes 58 and 60 pass therethrough. This trough is rather long. Therefore, there is a closure provided for the trough covering only half thereof, said closure consisting of the section 78 and the section 79 which is hinged by means of the piano type hinge 80 to another part of the housing 76. Accordingly, only sufficient amount of the trough is exposed at one time to feed or water a single animal preventing him from climbing into the trough.

Having described the invention, what is claimed as new is:

1. A stock watering device comprising, in combination, a receptacle for drinking water including a heating chamber, hot and cold water lines each communicating with both the receptacle and the chamber, a normally open temperature responsive control valve interposed in the hot water line, and common means controlling communication between the receptacle and both water lines.

2. A stock watering device comprising, in combination, a receptacle for drinking water including a heating chamber, hot and cold water lines each communicating with both the receptacle and the chamber, a normally open temperature responsive control valve interposed in the hot water line, and common means controlling communication between the receptacle and both water lines, said means including a normally closed, animal opened valve having its intake side connected to said water lines and its discharge side communicating with said receptacle.

3. A stock watering device comprising a receptacle including spaced inner and outer walls defining a heating chamber, a normally closed valve having its discharge side communicating with the receptacle, said valve including a chamber on its intake side, a cold water line connected to the valve chamber and communicating with the heating chamber, a hot water line connected to said valve chamber, a normally open temperature responsive valve interposed in the hot water line, and means operable by an animal for opening the first named valve.

4. A stock watering device comprising a trough including spaced inner and outer walls defining a heating chamber, hot and cold water lines communicating with said heating chamber, a normally open temperature responsive control valve interposed in the hot water line, a sleeve communicating with the trough and with the hot water line on the discharge side of the valve, and a normally closed, animal opened valve controlling the sleeve.

REINHARD C. LINDEMANN.

No references cited.